Figure 1:
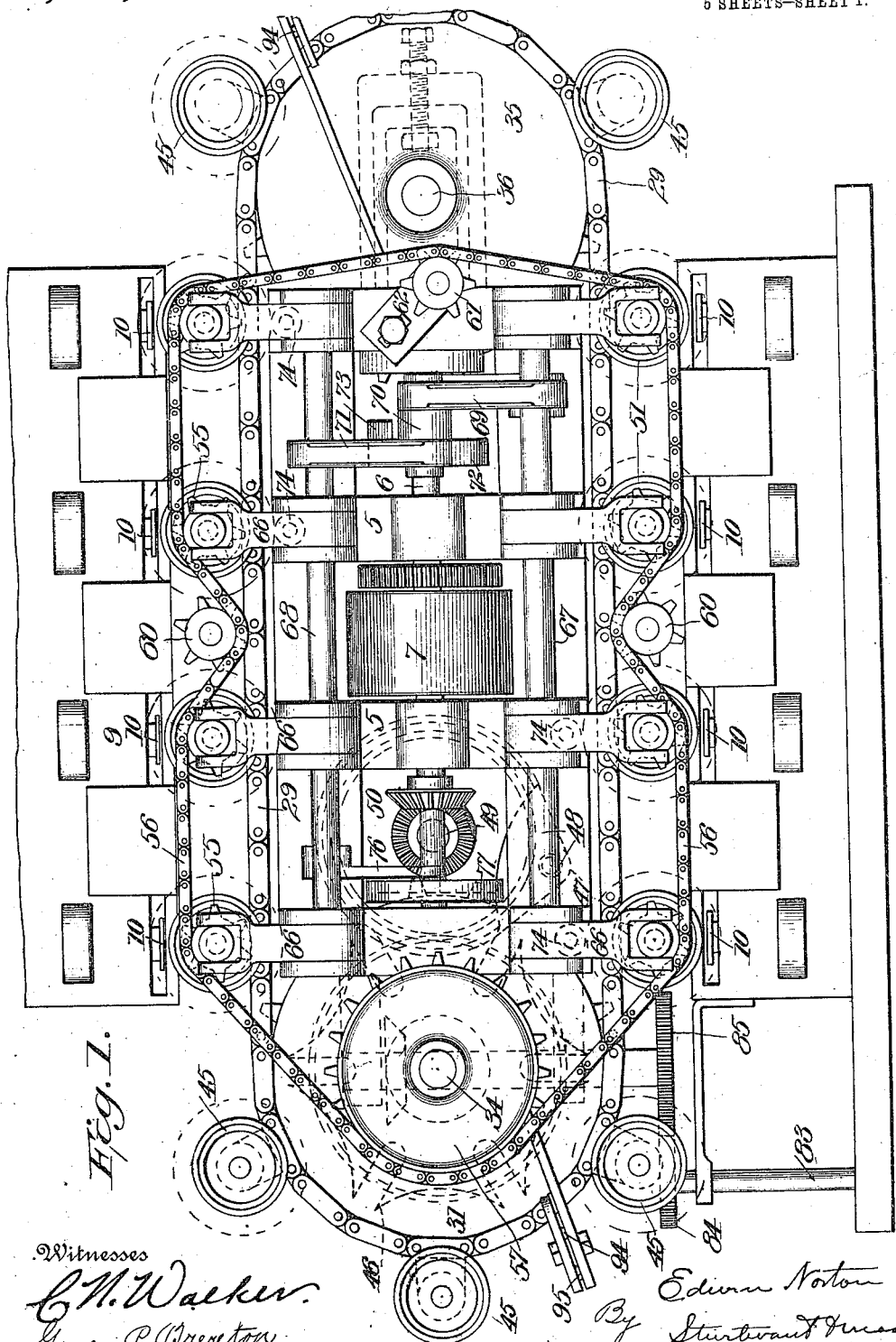

E. NORTON.
MACHINE FOR COATING CAN ENDS.
APPLICATION FILED NOV. 11, 1909.

1,060,112.

Patented Apr. 29, 1913.

5 SHEETS—SHEET 1.

Witnesses
C. N. Walker.
Grace P. Brereton.

Edwin Norton
By Sturtevant & Mason
Attorneys

E. NORTON.
MACHINE FOR COATING CAN ENDS.
APPLICATION FILED NOV. 11, 1909.
1,060,112.
Patented Apr. 29, 1913.
5 SHEETS—SHEET 2.
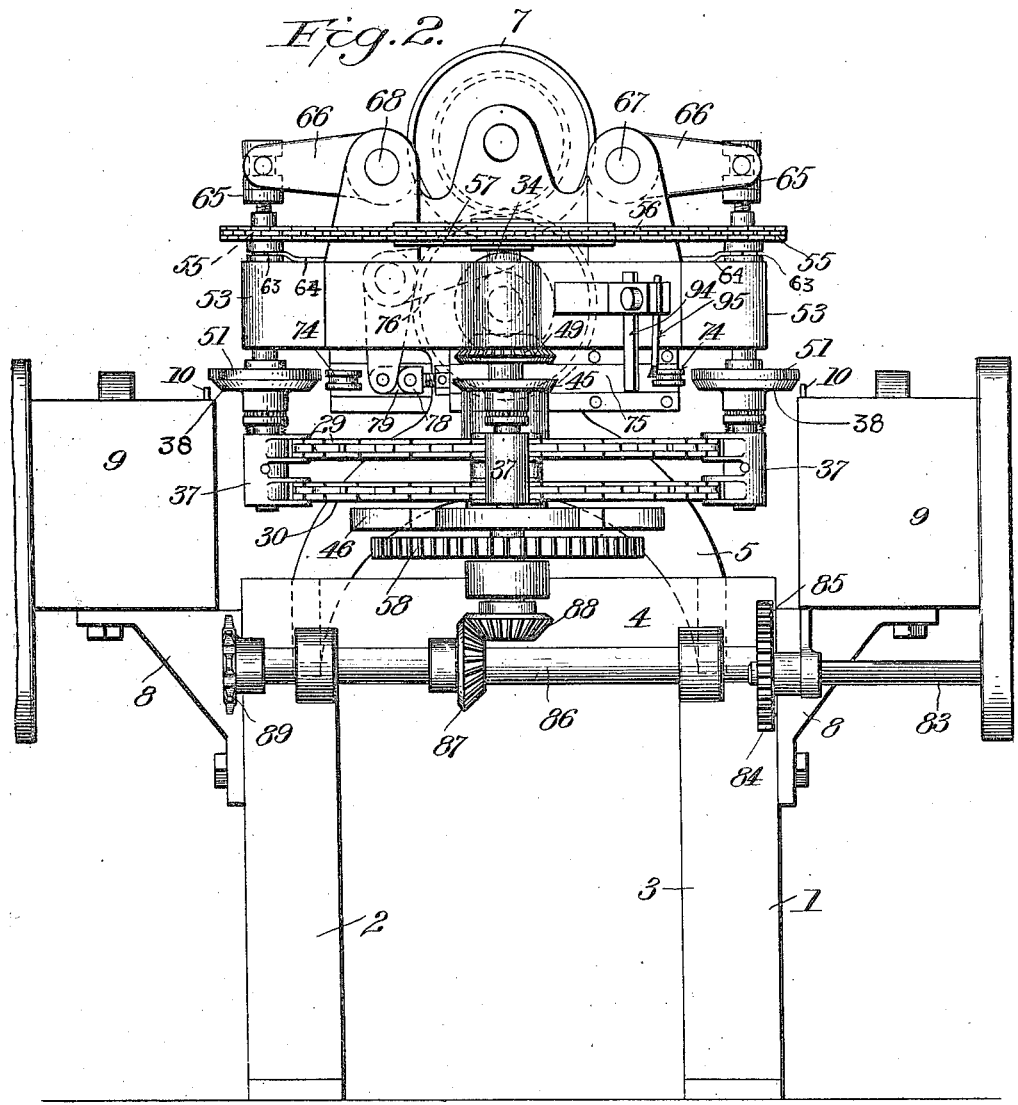

E. NORTON.
MACHINE FOR COATING CAN ENDS.
APPLICATION FILED NOV. 11, 1909.
1,060,112.
Patented Apr. 29, 1913.
5 SHEETS—SHEET 3.
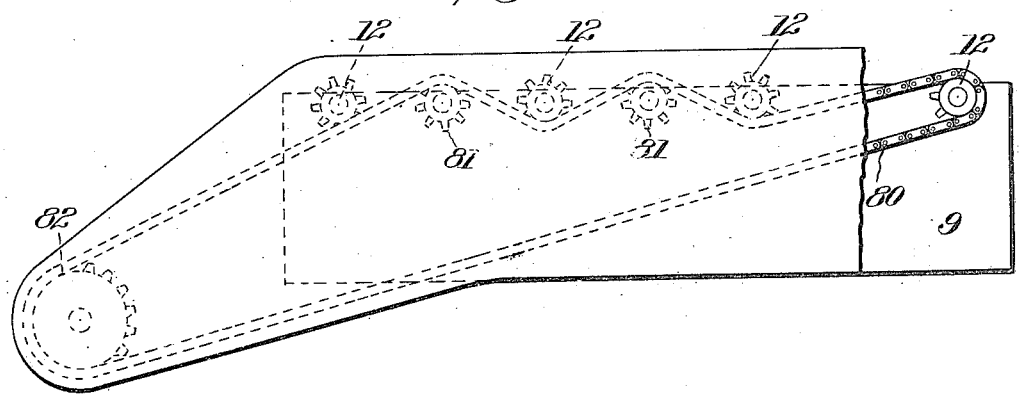
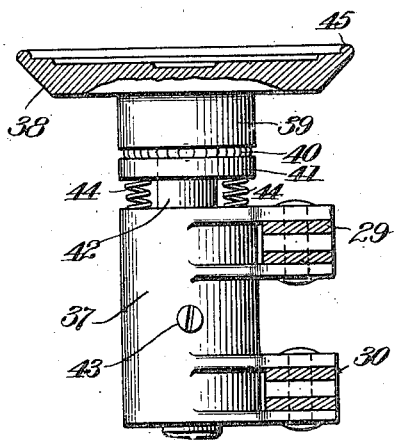
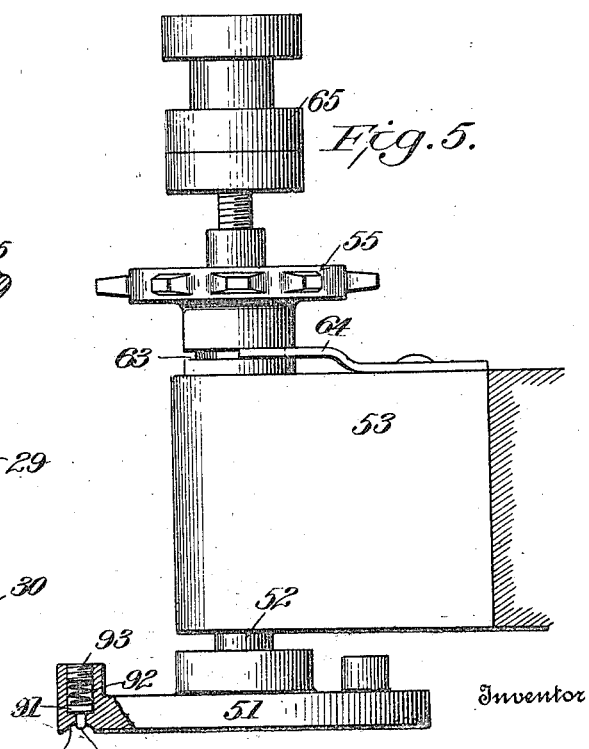
Witnesses
C. N. Walker
Grace P. Brereton
Inventor
Edwin Norton
By
Sturtevant & Mason
Attorneys

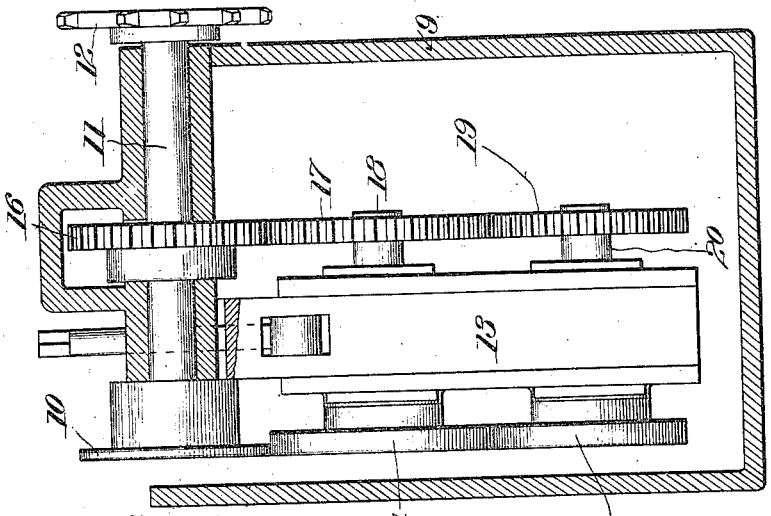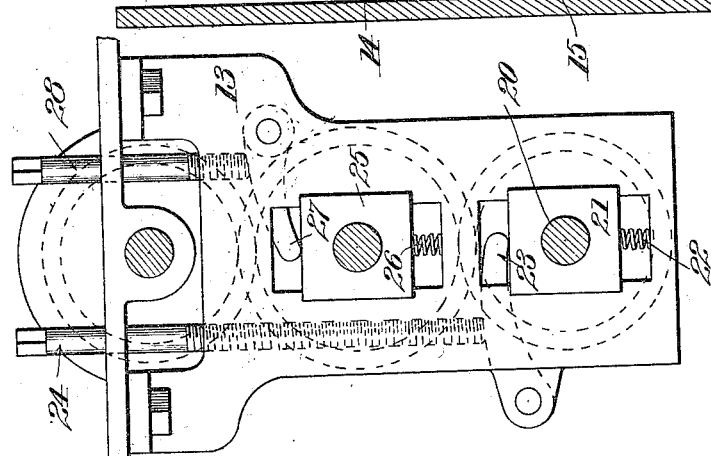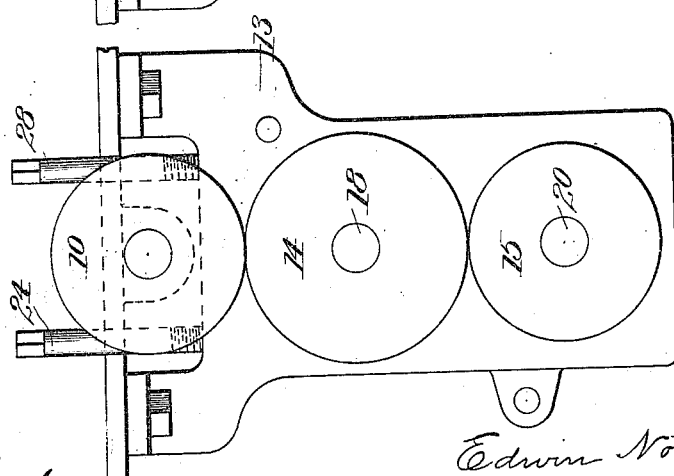

E. NORTON.
MACHINE FOR COATING CAN ENDS.
APPLICATION FILED NOV. 11, 1909.
1,060,112.
Patented Apr. 29, 1913.
5 SHEETS—SHEET 5.
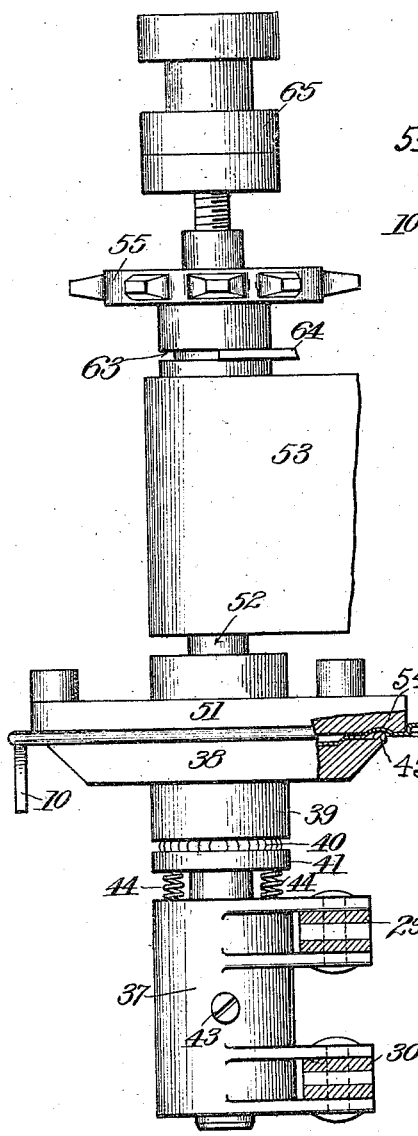
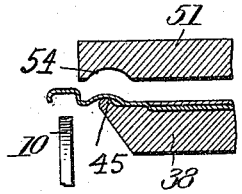
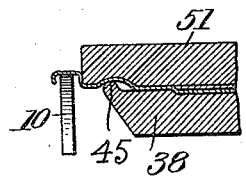
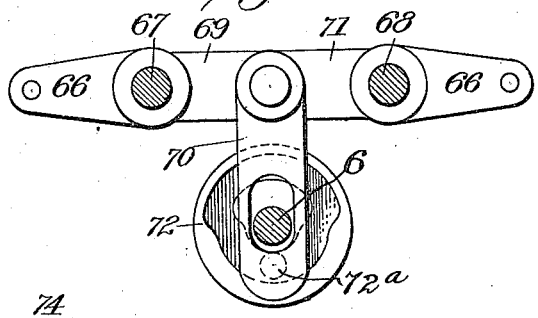
Witnesses
C. N. Walker
Grace P. Brereton
Inventor
Edwin Norton
By Sturtevant & Mason
Attorneys

UNITED STATES PATENT OFFICE.

EDWIN NORTON, OF NEW YORK, N. Y., ASSIGNOR TO AUTOMATIC VACUUM CANNING COMPANY, OF CHICAGO, ILLINOIS, A CORPORATION OF ILLINOIS.

MACHINE FOR COATING CAN ENDS.

1,060,112.　　　　Specification of Letters Patent.　　Patented Apr. 29, 1913.

Application filed November 11, 1909. Serial No. 527,367.

*To all whom it may concern:*

Be it known that I, EDWIN NORTON, a citizen of the United States, residing at New York city, in the county of New York, State of New York, have invented certain new and useful Improvements in Machines for Coating Can Ends, of which the following is a description, reference being had to the accompanying drawing and to the letters and figures of reference marked thereon.

The invention relates to new and useful improvements in machines for coating can ends.

An object of the invention is to provide an intermittently operating traveling support for conveying the end to the coating means.

A further object of the invention is to provide a combined rotating mechanism, an intermittent feed for conveying the ends to the coating means, and for rotating the same in contact therewith.

A further object of the invention is to provide a rotating chuck together with an intermittent feed, carrying supporting members adapted to coöperate with the rotating chuck.

A further object of the invention is to provide a coating machine with a plurality of operating stations, whereby one layer may be placed on another and a relatively thick coating built up.

A further object of the invention is to provide a coating machine with a plurality of coating stations, and an intermittent feed for conveying the ends from one station to another and supporting the ends at the stations, during the coating operation.

A still further object of the invention is to provide a coating machine with mechanism for giving the edge of the end a preliminary curl.

These and other objects will in part be obvious and will in part be hereinafter more fully disclosed.

In the drawings which show by way of illustration one form of my invention; Figure 1 is a top plan view of a coating machine embodying my invention. Fig. 2 is an end view of the same. Fig. 3 is a detail sectional view showing one of the supporting shafts at the end of the machine, and the operating mechanism supported thereby. Fig. 4 is a detail partly in section, of one of the supports for the ends. Fig. 5 is a detail partly in section, of the rotating chuck and the operating parts connected thereto. Fig. 6 is a detail showing a side view of the coating tank. Fig. 7 is a sectional view through the tank. Fig. 8 is a detail showing in side elevation, the support for the printing wheels. Fig. 9 is a view similar to Fig. 8, showing the printing wheels in face view. Fig. 10 is a detail partly in section showing the curling roll in action. Fig. 11 is a detail in section of the support for the can end, the chuck, and the coating wheel. Fig. 12 is a similar view showing parts in different position. Fig. 13 is a detail of means for moving the chuck longitudinally. Fig. 14 shows a series of ends stacked.

In carrying out my invention, I have provided a coating mechanism which consists of a plurality of printing wheels which may be of the usual construction. Said printing wheels may be arranged so as to form a plurality of stations. At each station is a rotating chuck which may be raised and lowered as well as rotated. The can ends are conveyed to the coating stations by an intermittently operated endless carrier on which are mounted spaced supports for the can ends, which are adapted to be rotated so that the can end may be revolved, while in contact with the coating mechanism. After the supports are brought to the operating stations, the chucks are lowered on to the can ends, and revolve the same with their supports. The supports are preferably mounted so as to yield, and are pressed down by the chuck thus carrying the can end into contact with the printing wheel.

Referring to the drawings, I will describe the present illustrated embodiment of my invention, although it will be understood that minor changes in the details of construction and the arrangement of parts may be made without departing from the spirit of my invention.

*Supporting frame.*—The various parts of the machine are carried by a supporting frame 1, which may be of any desired construction. Said supporting frame as herein shown is composed of supporting legs 2, 3, and cross beams 4. Rising from the supporting frame 1, are a plurality of brackets 5, which carry the main shaft 6, which shaft is rotated by a pulley 7, which in turn is operated in any desired way. Said pulley 7 is carried by a cross shaft geared to shaft 6. The supporting frame also carries at each side, as herein shown, a bracket 8 which supports a coating tank 9.

*Coating mechanism.*—The coating tank 9 shown in detail in Figs. 6 to 9 inclusive, is of oblong construction and is adapted to receive the coating material. The machine herein shown, is provided with two coating tanks for the reason that said machine is constructed so as to be fed by two operators, and in certain respects is merely a duplicate of the necessary assembled mechanism for completely coating a can end.

The coating is applied to the can end by means of a printing wheel 10, which is mounted on a short shaft 11, supported in a bearing formed in the cover for the tank 9. At its outer end said shaft 11 carries a sprocket wheel 12. The cover also carries a depending bracket 13. A feed wheel 14 operates to supply the printing wheel 10 with the coating material, and a feed wheel 15 in turn supplies the coating wheel 14 with material provided there is not sufficient material in the tank to reach the surface of the coating wheel 14.

The shaft 11 carries a gear wheel 16 which in turn meshes with a gear wheel 17 mounted on the opposite end of a short shaft 18, supporting the coating wheel 14. The gear 17 also meshes with a gear 19 carried by a short shaft which in turn supports the coating wheel 15. The shaft 20 is mounted in a vertically adjustable bearing 21, which is normally pressed upwardly by a spring 22. A pivoted arm 23 rests against the upper face of the bearing 21, and limits the vertical movement of said bearing. A threaded bolt 24 extending up through the cover where the same may be readily accessible, bears at its lower end against the arm 23 and by turning the bolt in one direction or the other, the position of the bearing 21 may be readily adjusted vertically and in turn the position of the coating wheel 15 raised and lowered. The shaft 18 carrying the coating wheel 14 is also mounted in a vertically adjustable bearing 25, which slides in a slot formed in the bracket 13. A spring 26 engaging the lower face of the bearing 25, normally tends to raise said bearing and an arm 27 limits its upward movement. A threaded bolt 28 extending also through the cover where it may be readily accessible, bears against the arm 27 and serves as a means for adjusting the position of the coating wheel 14. When it is desired to increase the thickness of the coating supplied to the end by the printing wheel, the coating wheels 14 and 15 are adjusted by means of the bolts 28 and 24, respectively, and thus the distance between the coating wheels and also the distance between the upper coating wheel and the printing wheel, varied so that the thickness of the layer of coating material conveyed from one wheel to the other, is varied and in turn the thickness of the coating supplied to the cover by the printing wheel also varied.

*Intermittent feeding mechanism.*—The can ends are brought to the coating mechanism by an intermittent feeding mechanism, which in the present illustration is in the form of two feed chains 29 and 30, (see Fig. 2). The feed chain 29 at the left hand end of the machine as viewed in Fig. 1, engages a sprocket wheel 31, while the feed chain 30 engages a sprocket wheel 32, (see Fig. 3). These sprocket wheels are splined to a common sleeve 33 mounted so as to turn freely on the vertical shaft 34. At the other end of the machine, said feed chains are carried by similarly disposed sprocket wheels 35, which are mounted to turn on a vertical shaft 36.

The shaft supporting the sprocket wheels 35 is mounted in a bearing which may be adjustable so as to take up the slack in the feed chains. The manner of adjusting the shaft 36 may be of any desired form and I have indicated diagrammatically in Fig. 1, in dotted lines, a common means for securing said adjustment.

The feed chains carry spaced brackets 37. Said brackets are connected near their upper and lower ends to the feed chains by suitable spaced arms, so that said brackets are held in vertical position, and are carried first across one side of the machine, and then the other, by the traveling chains. Each of said brackets 37 carries a support 38, for the can end. In Fig. 4, I have shown one of the brackets and supports as enlarged. The support 38 has a depending collar 39 resting on a plurality of balls 40, which balls in turn rest on a supporting collar 41. It will be seen therefore, that the support 38 is so constructed that it may be turned freely on the supporting bracket 37. A supporting stem 42 is secured to the bracket 37 by means of a set screw 43, and said stem projects upwardly through the collar 41, into the collar 39. The collars 39 and 41 are mounted on the stem 42 so that they may be moved longitudinally thereof. Any suitable means may be provided for limiting the upward movement of said collars, and springs 44, 44, are interposed between the bracket 37 and the supporting collar 41, which springs normally tend to hold the support 38 in its elevated or raised position.

The object of holding the support normally raised is so that the cover carried thereby may be fed over the printing wheel of the coating mechanism, without striking the same, and to allow the cover to be depressed or lowered on to the printing wheel after it is properly positioned by the feeding mechanism relative to said printing wheel.

The support 38 is provided with a projecting rib 45 on its upper face, which serves as a means for directly engaging and supporting the end. The brackets 37 are spaced on the feed chains the same distance apart as the distance between the centers of the coating wheels so that when one bracket and the supporting member carried thereby is properly positioned at one coating station, the other brackets and supporting members are likewise properly positioned at the other coating stations.

As a means for operating intermittently the feed chains I have provided the ordinary Swiss stop movement. The radially slotted stop wheel 46 (see Figs. 2 and 3) is keyed to the lower end of the sleeve 33 and is operated by a crank disk 47 carrying a crank pin 48. The crank disk 47 is mounted on a vertical shaft 49 (see Fig. 1) which at its upper end carries a beveled gear meshing with a beveled gear 50 mounted on the main shaft.

On the rotation of the main shaft 6, the crank disk 47 will intermittently rotate the stop wheel 46 and in turn impart to the feed chains 29 and 30 an intermittent movement. The radial slots in the stop wheel are so disposed that said chains are brought to rest with the brackets 37 and the supporting members 38 for the ends properly positioned relative to coating stations.

*Mechanism for rotating the ends.*—After the ends are brought to the coating stations by the intermittently operated means, each end is rotated by means of a chuck 51. The chuck 51 (see Fig. 5) is carried by a stem 52 mounted so as to rotate and slide vertically in a bracket 53 supported by the brackets 5 carried by the frame 1 of the machine. The chuck 51 has a groove 54 formed therein near its outer periphery, which receives the usual upwardly projecting rib of the can end. The chuck is rotated by means of a sprocket wheel 55 and a sprocket chain 56 which engages each of the sprocket wheels 55, carried by the chuck stems. Said sprocket chain 56 engages a driven sprocket wheel 57, mounted on the shaft 34. The shaft 34 carries a gear 58 near its lower end (see Figs. 2 and 3), which gear meshes with a gear 59, mounted on the shaft 49.

As the shaft 49 rotates in the manner above described, the shaft 34 will be rotated within the sleeve 33 of the feed operating mechanism, and independently thereof, thus imparting a continuous rotation to the sprocket wheel 57, and in turn a continuous rotation to each of the sprocket wheels mounted on the upper end of the chuck stems. As a means for retaining the sprocket chain 56 in contact with the sprocket wheels carried by the chuck stems, an idle sprocket wheel 60 is located at each side of the machine and engages the outside of said sprocket chain. The sprocket chain also runs over a second idle sprocket wheel 61, carried by an adjustable bracket 62, by means of which any slack in the sprocket chain may be taken up. After the can ends are conveyed by the intermittently operating feeding mechanism underneath the chucks, said chucks are then lowered upon the can ends. The stem 52 carrying the chuck slides freely through the sprocket wheel 55, but said sprocket wheel is splined to the stem so that these parts rotate together. The sprocket wheel is provided with a collar having a slot 63 which receives a forked arm 64 and holds said sprocket 55 from lateral movement.

The upper end of the chuck stem has threaded thereon a slotted collar 65 which engages the forked end of a lever 66, (see Figs. 1 and 2). Each chuck is provided with a lever 66 and all of the levers on one side of the machine are mounted on a shaft 67, while the levers on the other side of the machine are mounted upon a shaft 68. The shaft 67 carries an arm 69 (see Fig. 1), which at its free end is connected to a vertically sliding bar 70. The shaft 68 carries an arm 71 also secured to the sliding member 70. A disk 72 having a face cam groove cut therein is mounted upon the shaft 6, (see Figs. 1 and 13). The sliding member or bar 70 is provided with a vertical slot which engages the shaft 6, and directs the movements of the sliding member or bar 70. Said sliding member 70 carries a roller 72ᵃ which engages the cam groove in the disk 72. The cam groove has two concentric portions located at different distances from the center of the disk and as the disk rotates, the sliding bar 70 will be raised and lowered and held first in raised and then in lowered position. This movement of the sliding member or bar 70, will oscillate the arms 69 and 71 which in turn oscillate the shafts 67 and 68, thus raising and lowering the chucks so that they are brought into contact with the can ends on the supports 38, and said enls together with the supports are depressed until the can end carried by each support is brought into operative contact with the printing roll at each coating station.

*Preliminary curling device.*—In order to prepare the can end for the seaming rolls, it is very desirable to give to the edge of the can end a preliminary curl, so that when the end is placed on the can body and the seaming rolls are brought into contact with the edge thereof, said edge of the end and the flange of the can body will be readily rolled into a seam. This preliminary curling of the can end also aids in protecting the coating applied to the can end, as it enables the ends to be stacked one upon the other and the curled portion of the end serves as a means for supporting the end and spacing the same from the adjacent end so that the coating on the end is free from contact with the metal of the adjacent end. This preliminary curling of the edge of the end, is secured by means of a curling roll 74 (see Figs. 1 and 10). The curling roll 74 is located so as to operate upon the end at the last coating station, before the end is ejected from the machine. The roll is provided with a central groove which engages the edge of the end, and by pressing the roll toward the center of the rotating end, the edge is rolled over into a preliminary curling, as clearly shown in Fig. 10. The curling roll 74 is carried by a slide 75, mounted in suitable guiding brackets, and at its rear end said slide is connected to a rock lever 76, which carries a roller coöperating with a face cam 77 mounted on the shaft 6, (see Fig. 1). The rear end of the slide 75 has an adjustable bolt 78, (see Fig. 2) which is connected to the rock shaft 76, by means of a link 79. By adjusting the bolt 78 in the slide 75, the amount of curl given to the cover may be varied.

*Operating means for the coating mechanism.*—The printing wheel of the coating mechanism is rotated by means of a sprocket chain 80. Said sprocket chain engages each of the sprocket wheels 12 and intermediate sprocket wheels 81, which serve to hold the chain in contact with the sprocket wheels 12 (see Fig. 6). A sprocket wheel 82 is mounted on the end of a cross shaft 83 which carries a gear 84 meshing with a gear 85 (see Figs. 1 and 2), mounted in turn on the cross shaft 86. Said shaft 86 carries a beveled gear 87 meshing with a beveled gear 88 mounted on the lower end of the shaft 34, which is rotated in the manner above described.

A sprocket wheel 89 mounted on the end of the shaft 86, operates through a similar train of mechanism, the coating mechanism on the opposite side of the machine.

*Means for ejecting the ends from the machine.*—After the can ends have been properly coated, the chucks 51 are raised from the ends allowing the supports 38 to be raised by means of the springs 44, thus lifting the ends from the printing rolls. In order to cause the chuck to be released with certainty from the end, leaving the end upon the support, I have provided each chuck with a plurality of ejectors. Each of said ejectors as herein shown, comprises an ejecting stud 90 (see Fig. 5), which is carried by a flat head 91 mounted in a recess formed in the chuck. A spring 92 normally holds the ejecting stud so that the same projects from the face of the chuck. A screw 93 supports the upper end of the spring. When the chuck is lowered upon the end, the ejecting studs are forced upward, compressing the spring 92, and as soon as the chucks are raised, said springs will operate upon the ejecting studs so as to strip the end from the chuck.

I prefer to use three ejecting studs which are symmetrically disposed upon said chuck. After the chuck is raised from the support and the support is raised to its normal position, the sprocket chains carry said supports along so that the end carried by the support comes in contact with an arm 94 or a brush 95 (see Figs. 1 and 2) which serve to knock the end from the support and said ends drop into any suitable receptacle.

While I have described the part 38 as a supporting member for the can end, it is obvious that this part is in a measure a rotatable chuck which coöperates with the chuck 51 in clamping and sustaining the can end or can head so that when the can end or head is clamped between the rotary holder chucks, said end or head peripherally projects from the edges of the chucks so that the coating roll may be caused to engage the projecting flange and coat the same. This allows the can end or head to be firmly clamped between the two rotatable parts so that the machine may be given considerable speed without dislodging the can end, and still the parts of the can end to be coated, project sufficiently to be engaged by the coating roll.

*Operation of machine.*—In the operation of my machine, one operator sits at each end of the machine, and an end is placed upon the support 38 which is at an idle station, and said support carries the end first to one coating station and then to another. As soon as the end reaches the coating station, the feed chain stops, the rotating chuck is depressed, and engages the upper surface of the end, clamping the same between the chuck and the support for said end. As the chuck is continuously rotated, the can end will at once be clamped and rotated by means of the rotating chuck. The chuck is further depressed so that the end is brought into contact with the printing or coating wheel, and a thin coating of the material properly placed upon the outer edge of the end. The chuck is then raised from the end allowing the support for the end to rise to normal position, lifting the end away from the coating wheel, and the feeding mechanism then conveys the support for the end together with the end to the next station, where a similar operation occurs. After the end has passed through the various coating stations, it is stripped from the support in the manner above described. At the last coating station, the preliminary curling roll is brought into action, which gives to the edge of the end when clamped and rotating with the chuck and support, a preliminary curling.

From the above description it will be apparent that I have provided a machine for coating can ends, wherein the rotatable supports or chucks for the can ends are moved laterally from a position or region where the can end is applied to the chuck, to a position or region where the can end is coated by a coating roll, and finally to a position or region where the can end may be discharged. This region of coating may include a number of coating stations, or a single station, as above noted.

While I have shown my machine as comprising a plurality of coating stations, it will be obvious that from certain aspects of the invention, I may use only a single coating station. When a volatile coating material is placed on the end, it is often desirable to apply a series of coatings one upon the other, thus building up a coating which will have a material thickness. If however, my coating machine was used to apply a coating of different consistency, a single coating station might be sufficient for giving to the end a coating of proper thickness.

Having thus particularly described my invention, what I claim as new and desire to secure by Letters Patent, is:—

1. A machine for coating can ends comprising in combination, a rotary chuck, means for supporting and moving said chuck laterally, whereby the same is brought to a position to receive a can end, then moved laterally to coating region and finally to position for discharging the can end, a second chuck adapted to engage the can end on the first chuck, whereby the end is clamped between the chucks, means for rotating the chucks, a coating roller and means for causing a coating roller to contact with the flange of the can end for coating the same while the same is rotated by the chucks.

2. A machine for coating can ends comprising in combination, a coating station, including a coating roll, a movable carrier, a plurality of supports carried by said carrier, each adapted to receive a can end, means for intermittently operating said carrier, means for rotating the can end and its support at the coating station and means for bringing the end in coating contact with said roll.

3. A machine for coating can ends, comprising in combination a coating station, including a coating roll, an endless carrier, a plurality of supports mounted on said endless carrier, each adapted to receive a can end, means for intermittently operating said carrier, means for rotating the can end and its support at the coating station, and means for bringing the can end in coating contact with said roll.

4. A machine for coating can ends comprising in combination a coating station, including a coating roll, a plurality of endless spaced carriers, a plurality of brackets carried thereby, a support mounted in each bracket and adapted to receive a can end, means for intermittently moving said carriers to bring the supports to the coating station, and means for rotating the can end and support at the coating station, with the can end in coating contact with the coating roll, said carrier remaining at rest during the rotation of the can end.

5. A machine for coating can ends, comprising in combination a coating station including a coating roll, a support for the can end, means for intermittently moving said support, a rotating chuck located at the coating station and adapted to coöperate with said support, means for moving said chuck into contact with the can end for rotating said end and its support with the end in coating contact with said roll.

6. A machine for coating can ends including in combination, an intermittently operated carrier, a plurality of supports mounted on said carrier, a coating roll, a rotating chuck located adjacent said coating roll, means for intermittently moving a support and the can end carried thereby underneath said chuck, means for moving said rotating chuck into contact with the can end for rotating the same and its support with the can end in coating contact with said roll.

7. A machine for coating can ends, including in combination, a coating device, a plurality of yielding supports each adapted to receive a can end, means for moving said supports successively to and away from the coating device, a rotating chuck located adjacent said coating device, and means for moving said chuck into contact with the can end for depressing the support carrying the can end so that said can end is brought into contact with the coating device.

8. A machine for coating can ends including in combination, a coating device, a support mounted to rotate and adapted to receive the can end, means for normally holding said support elevated and the can end out of contact with the coating device, and means for depressing said support and for rotating said end in contact with the coating device.

9. A machine for coating can ends including in combination, an endless conveyer, a plurality of brackets carried thereby, supports yieldingly mounted in said brackets and adapted to be rotated, means for intermittently moving said conveyer, a coating device, a rotating chuck located adjacent said coating device, and means for moving said chuck into contact with an end on its support, and for depressing said support so that the end is brought into contact with the coating device.

10. A machine for coating can ends, comprising in combination a coating station, including a coating roll, a plurality of yielding supports each adapted to receive a can end, an endless conveyer for moving said yielding supports successively away from the coating station, a rotating chuck located adjacent the coating roll, and means for moving said chuck into contact with a can end for depressing the support carrying the same, so that said can end is brought into contact with the coating roll.

11. A coating machine including in combination, a chuck, means for rotating the same, an endless conveyer, supports carried by said endless conveyer and adapted to rotate thereon, each of said supports adapted to receive a can end, means for intermittently moving said supports underneath said chuck and means for moving said chuck vertically whereby said chuck will engage the can end and rotate the same and its support, and means for coating said can end as it is rotated.

12. The combination with a yielding rotatable support, of a rotary chuck, means for rotating said chuck whereby said chuck is adapted to engage a can end on said support, and rotate said can end and support, said chuck having an annular recess formed adjacent its edge to receive the annular bead formed on the can end, said chuck having a plurality of apertures opening into said recess, ejecting pins located in said aperture, each of said ejecting pins having an enlarged head to limit its movement in one direction, a spring bearing against each of said enlarged heads and a screw bearing against the other end of each of said springs whereby said ejecting pins operate through the action of the springs to strip the can end from the chuck when said chuck is withdrawn from the support.

13. A machine for coating can ends comprising in combination, a plurality of coating stations, each including a coating roll, means for intermittently moving each can end to and from each station, and for rotating the end at each station, in contact with the coating roll, whereby a plurality of coatings are applied to each can end.

14. A machine for coating can ends including in combination a plurality of spaced coating stations, a conveyer, a plurality of supports for the can ends carried by said conveyer and spaced the same distance as said coating stations, means for intermittently operating said conveyer whereby the can ends are carried from one station to another and means for rotating the can ends at the coating stations.

15. A machine for coating can ends including in combination, a plurality of coating stations, an endless conveyer, brackets supported by said conveyer, and spaced the same distance as said coating stations, supports carried by said brackets for receiving can ends, a rotating chuck located at each station, means for intermittently operating said conveyer, and means for intermittently moving said chucks into contact with the can ends for rotating the same at the coating stations.

16. A machine for coating can ends, including in combination a plurality of coating stations, an endless conveyer, brackets carried by said endless conveyer, and spaced the same distance as said coating stations, a yielding support carried by each bracket, a rotating chuck located at each coating station, means for moving said chuck into contact with the end on each support, and for depressing said support, whereby the end is brought into contact with the coating device at the coating station.

17. A machine for coating can ends including in combination, a plurality of coating stations, a plurality of rotating chucks located one at each coating station, means for simultaneously rotating said chuck, and means for simultaneously moving said chucks up and down so that they are brought into contact with the can ends and means for conveying the can ends to the coating stations.

18. The combination of a coating wheel, means for rotating the same, means for supplying said coating wheel with a liquid coating material, a rotating support for a can end, a rotating chuck, means for yieldingly mounting said support, and means for moving said chuck into contact with the can end on the support for rotating the same, and depressing said support so as to bring the can end into contact with the coating wheel.

19. The combination of a rotatable support, a chuck, means for rotating the chuck, means for reciprocating the chuck so that said chuck is caused to engage the can end on said suport, and rotate said can end and support, a coating roll adapted to engage the can end on said rotating support, a bracket for supporting said coating roll, a plurality of supplying wheels for feeding a coating of liquid to said coating roll, means for yieldingly supporting said supplying wheels, and adjusting bolts for adjusting the position of said supplying wheels, relative to each other and relative to the coating roll whereby the thickness of the coating applied to the can end may be varied.

20. A coating machine comprising in combination, means for engaging the upper and lower faces of a can end for supporting and rotating the same, means for coating the end including a coating device positioned so as to engage and coat one face of the can end adjacent its outer edge, and means movable in the plane of and in contact with the edge of the rotatable can end to bend a preliminary curl in said edge to protect the coating.

21. A coating machine including in combination a rotatable support, a rotating chuck, a coating wheel, a curling wheel, a slide supporting said curling wheel, and means for reciprocating said slide, whereby the curling wheel is brought into contact with the edge of the can end, and a preliminary curl formed for protecting the coating.

22. A coating machine including in combination, a central framework, a coating device including a coating roll located on each side of said central framework, an endless carrier traveling along each side of said framework, and in operative relation to the coating devices, supports for the can ends mounted on said endless carrier, means coöperating with said supports for rotating the can ends in contact with the coating rolls, and means at each end of the framework for stripping the can ends from their supports.

23. A coating machine including in combination a central framework, a coating device located at each side of said framework, and including a plurality of coating stations, an endless carrier traveling along each side of said framework, brackets mounted on said carrier and spaced the same distance as said coating stations, a support for a can end mounted on each bracket, means for intermittently moving said supports and can ends from one station to another, and means located at each station for rotating said can end and its support.

24. A coating machine including in combination, a central framework, a main shaft mounted therein, a vertical shaft at one end of the framework, means for continuously operating said shaft from said main shaft, a sleeve mounted on said vertical shaft, means for intermittently operating said sleeve from said main shaft, a coating device, an endless carrier having supports for the can ends, means for operating the endless carrier from said sleeve, a chuck, and means for rotating said chuck from said continuously operated vertical shaft.

25. A coating machine comprising in combination, a pair of rotary can end holder chucks adapted to engage and clamp between them the opposite faces of the can end within its seam flange, and leave the seam flange peripherally projecting from the chucks, means for rotating said chucks, a coating roll and means for automatically bringing the coating roll into contact with the flange of the can end, for coating the same.

26. A machine for coating can ends, comprising a plurality of bodily traveling rotatable supports, adapted to engage and clamp a can end with its seam flange peripherally projecting from said supports, means for causing said supports to travel, means for moving the supports toward and from each other, whereby a can end may be placed between the same, a coating roll, and means for bringing the coating roll into contact with the flange of the can end projecting beyond the supports.

27. The combination with a pair of rotary can holder chucks adapted to engage and clamp between them the opposite faces of a can head between its seam flange and leave the seam flange peripherally projecting from said chucks, and a flange cement coating device.

28. The combination with a pair of rotary can-head holder chucks adapted to engage and clamp between them the opposite faces of the can head within its seam flange, and leave the seam flange peripherally projecting from said chucks, of a flange curling roller and a flange cement coating device, substantially as specified.

29. The combination with a pair of rotatable can-head holder chucks adapted to engage and clamp between them the opposite faces of a can head within its seam flange and leave the seam flange peripherally projecting from said chucks, of a flange curling device and a flange cement coating device, substantially as specified.

30. The combination with can head flange curling means, of can head flange coating means, and a can head holding means coöperating with both said curling means, and said coating means, substantially as specified.

In testimony whereof I affix my signature, in presence of two witnesses.

EDWIN NORTON.

Witnesses:
 FREDK. V. HAAS,
 V. A. NORTON.

---

Copies of this patent may be obtained for five cents each, by addressing the "Commissioner of Patents, Washington, D. C."